(No Model.)

L. L. SHARP.
GRAIN METER.

No. 453,068. Patented May 26, 1891.

WITNESSES:
Geo. F. Downing
S. G. Nottingham

INVENTOR
L. L. Sharp
BY
H. A. Seymour
ATTORNEY.

UNITED STATES PATENT OFFICE.

LINCOLN L. SHARP, OF DOUGLAS, NEBRASKA.

GRAIN-METER.

SPECIFICATION forming part of Letters Patent No. 453,068, dated May 26, 1891.

Application filed June 28, 1890. Serial No. 357,038. (No model.)

*To all whom it may concern:*

Be it known that I, LINCOLN L. SHARP, of Douglas, in the county of Otoe and State of Nebraska, have invented certain new and useful Improvements in Grain-Meters; and I do hereby declare the following to be a full, clear, and exact description of the invention, such as will enable others skilled in the art to which it appertains to make and use the same.

My invention relates to an improvement in grain-meters, and has for its object to produce a grain-meter which shall be of simple compact construction and accurate in operation.

A further object is to produce a grain-meter which may be readily attached to the spout of a thrasher, corn-sheller, or flour-mill, whereby the grain or flour may be automatically measured in certain predetermined quantities.

A further object is to so construct an automatic grain-meter having a series of buckets that while one bucket is emptying the grain will be automatically cut off and when the next bucket is in position the supply of grain will be again opened.

A further object is to so construct the meter that clogging of the material being measured will be prevented.

With these objects in view the invention consists in certain novel features of construction and combinations and arrangements of parts, as hereinafter set forth, and pointed out in the claims.

Figure 1:
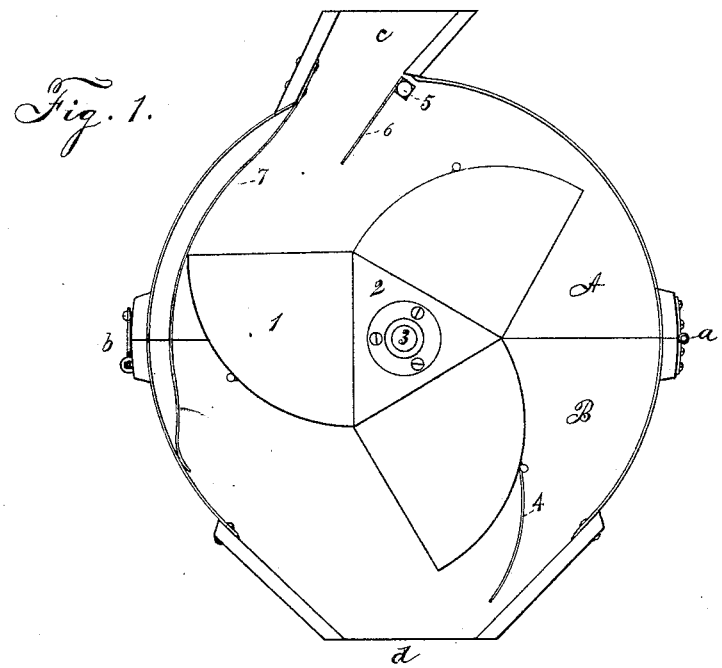
Figure 2:
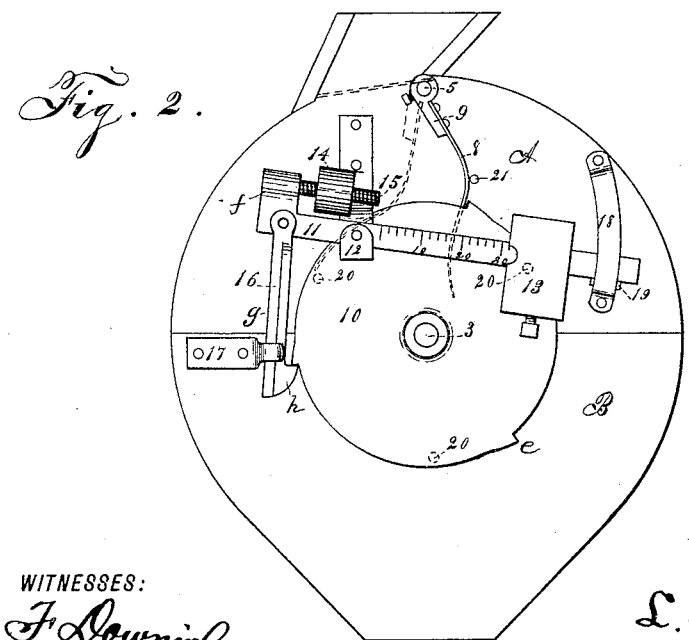

In the accompanying drawings, Figure 1 is a sectional view of my improved meter. Fig. 2 is a view illustrating the weighing mechanism.

A B represent the casing, the general form of which in side elevation is preferably oval, the two sections being connected together at one side by a suitable catch $b$. A throat $c$ projects from the top of the casing and is adapted to receive grain, &c., from a spout or other source of supply, and at the bottom of the casing an outlet $d$ is provided. Journaled centrally within the casing is a shaft 3, to which a triangular plate 2 is secured. Secured to the plate 2 at each edge thereof are triangular buckets 1, each having a curved bottom and preferably of sufficient size to receive one-half bushel of grain or other material. About one half of the bottom of each bucket is hinged to the other half, as clearly shown at 4, Fig. 1. The bottom of each bucket is held close, while the bucket is being filled, by means of flat springs 7, secured in one side of the casing and adapted to bear on the hinged bottoms of the buckets; but when a bucket has been filled and is released the weight of the grain will cause its hinged bottom to open, and thus cause its contents to discharge through the outlet $d$. By thus constructing the bottom of the buckets a very large outlet will be produced when a bucket is directly over the outlet $d$ of the casing and clogging of the grain in said outlet will be effectually prevented.

Mounted in the casing to one side of the throat $c$ is a shaft 5, carrying a gate 6, adapted to close the throat $c$. An arm 9 projects downwardly from the shaft and has secured to it a depending spring 8, adapted to be limited in one direction by means of a pin 21, and being bent inwardly extends over a portion of the face of the disk 10, carried by the shaft 3. The disk 10 carries a series of three pins 20 near its periphery and located at equidistant points on the disk. When a bucket has been filled and the shaft 3 begins to turn, one of the pins 20 on the disk 10 will engage the spring 8 and carry it forward, thus closing the gate 6, which gate will remain closed until the next bucket is in position to be filled, at which time the pin 20 will have passed the end of the spring 8 and the gate 6 thus be released. A series of three equidistant teeth project from the periphery of the disk 10 for a purpose presently explained. A bracket 12 is secured to the casing and pivotally supports a scale-beam 11, the free end of which is maintained in proper position by means of a guide-plate 18, at the lower end of which a block 19, of rubber or similar material, is located to receive the scale-beam. The scale-beam is provided at one end with an arm $f$, having a screw-threaded extension for the reception of an adjustable weight 14, and located on the scale-beam is a sliding weight 13. Pivotally connected to the short arm of the scale-beam and suspended therefrom is a rod 16, having a longitudinal flange $g$ and a tooth $h$, which latter is adapted to engage the teeth $e$ of the disk 10. A bracket 17, secured to the casing, is adapted to loosely embrace the flange $g$ of rod 16 and produce a guide therefor, so that when the short arm of the scale-beam moves down the teeth $h$ will be carried out of engagement with the disk 10, and thus permit the shaft 3 to rotate and the filled bucket to discharge.

A meter constructed and arranged as above described is simple in construction and effective and accurate in operation.

Having fully described my invention, what I claim as new, and desire to secure by Letters Patent, is—

1. In a grain-meter, the combination, with a casing, of a series of rotary buckets mounted therein, each of said buckets having one portion of its bottom hinged to the other portion, substantially as set forth.

2. In a grain-meter, the combination, with a casing, of a series of rotary buckets mounted therein, each of said buckets having one portion of its bottom hinged to the other portion, and a spring to maintain the bottoms of the buckets closed while the buckets are being filled, substantially as set forth.

3. In a grain-meter, the combination, with a shaft carrying a series of buckets and a disk having teeth on its periphery, of a scale-beam, a flanged rod pivotally suspended from the short arm of the scale-beam and provided with a tooth to normally engage one of the teeth of the said disk, and a bracket adapted to loosely embrace the flange of the rod and guide said rod in its movements, substantially as set forth.

4. In a grain-meter, the combination, with a shaft carrying a series of buckets and a disk having teeth on its periphery, of a scale-beam, a flanged rod suspended from the short arm of the scale-beam and provided with a tooth to normally engage one of the teeth of said disk, and a guide-plate and a yielding cushion carried by said guide-plate and adapted to receive the scale-beam, substantially as set forth.

In testimony whereof I have signed this specification in the presence of two subscribing witnesses.

LINCOLN L. SHARP.

Witnesses:
W. A. SELLECK,
A. W. LANE.